Patented May 30, 1933

1,912,301

UNITED STATES PATENT OFFICE

ALBIN PETER, OF BASEL, SWITZERLAND, ASSIGNOR TO THE FIRM OF CHEMICAL WORKS FORMERLY SANDOZ, OF BASEL, SWITZERLAND

PREPARATION OF DYESTUFFS OF THE ANTHRAQUINONE SERIES

No Drawing. Application filed March 7, 1932, Serial No. 597,427, and in Germany and Great Britain June 5, 1931.

The present invention relates to the preparation of new dyestuffs of the anthraquinone series.

According to the invention new water soluble dyestuffs of the anthraquinone series can be prepared by introducing sulphonic acid groups into arylamino-anthrapyridones of the general formula

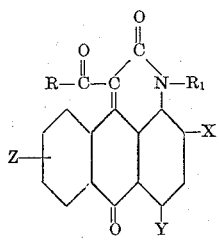

wherein R represents phenyl, alkyl or alkoxy, $R_1$ represents hydrogen or alkyl, X represents hydrogen, alkyl, alkoxy or halogen, Y represents hydrogen, -NH-aryl, NH-cycloalkyl, and Z represents hydrogen; -NH-aryl, alkyl, or -NH-cycloalkyl groups and wherein of Y and Z at least one must represent a -NH-aryl or a -NH-cycloalkyl residue.

Such compounds can for instance be prepared by condensing with aromatic or hydro-aromatic bases such halogenated anthrapyridones as are prepared by condensing anthraquinone compounds containing at least one amino or alkylamino group in α-position, with esters of the formula $R_1$-CO-$CH_2$-CO-O-alkyl, wherein $R_1$ represents a phenyl, an alkyl or an alkoxy group (see the copending application Ser. No. 549,325, filed July 7, 1931). According to the sulphonation method employed different dyestuffs may be obtained.

Dyestuffs containing one or several sulphonic groups in the aryl residue are obtained by treating the arylaminoanthrapyridones with sulphuric acid monohydrate or with fuming sulphuric acid of various concentrations. According to the strength of the sulphonating medium, dyestuffs of different shades may be prepared; this result may also be attained by varying the temperature of the sulphonation. The preparation of uniform dyestuffs does not, however, present any difficulties.

If X represents a halogen, it can be replaced by a sulphonic group by treating the arylamino-anthrapyridones with sulphites in the usual manner. It is also possible to combine the different sulphonation processes and to prepare dyestuffs containing sulphonic groups in the aryl- and in the anthrone residues.

The new dyestuffs prepared according to the present process dye animal fibres bright yellow to blue-red and violet shades. They yield dyeings on wool of an excellent fastness to light and milling which are characterized by a brightness of shade hitherto unattained in this class of dyestuffs.

The following examples serve to illustrate various ways in which this invention can be carried out in practice, but it is understood that the invention is not limited to these examples:

*Example 1*

The compound of the following formula

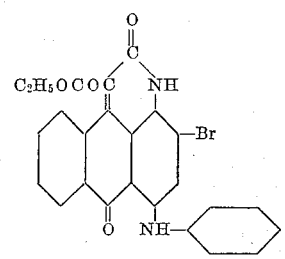

is heated with sulphuric acid monohydrate to about 40° C., until a sample dissolves in water to a clear solution. The sulphonation product is poured on to ice and worked up in the usual manner. The dyestuff thus obtained dyes wool a violet-red. If the sulphonation is carried out in the presence of free sulphuric anhydride, then a further sulphonic group enters the molecule and a dyestuff of a redder shade is obtained.

If, on the other hand, the base is heated in an autoclave with potassium sulphite, phenol and water until complete solubility in water is attained, then a reddish-violet dyestuff for wool is formed by the substitution of the bromine atom in position 2 by the sulphonic group. Furthermore, it is possible to convert the dyestuffs sulphonated in the aniline nucleus into still more soluble dyestuffs by treatment with sulphite. The bases obtained with m-toluidine and m-chloraniline behave in the same way as bases from aniline. The m-toluidine dyestuffs are of similar shades to the corresponding aniline dyestuffs; the m-chloraniline dyestuffs are of a more yellowish shade. If, however, the aniline is replaced by p-toluidine, p-chloraniline, xylidine, anisidine, cresidine, etc., then on sulphonation by sulphuric acid monohydrate or weak oleum at temperatures below 50° C., two series of different highly sulphonated products are not obtained.

*Example 2*

The compound of the following formula

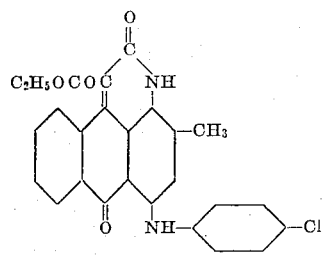

is heated in weak oleum at 40° C., until a sample dissolves in water to a clear solution. A dyestuff dyeing wool a bluish-red is obtained.

If, on the other hand, the heating is carried out at 70° C., then a new dyestuff is obtained with a yelowish-red shade. There are some grounds for believing that this treatment involves a splitting of the ester group so that a pyridone-carboxylic acid is obtained.

As in Example 1, other aromatic bases can be used to replace the p-chloraniline used in the preparation of the condensation product. With p-toluidine there are obtained more bluish dyestuffs, with dichloraniline more yellowish dyestuffs. Furthermore, in the same way dyestuffs can be obtained in which the aniline residue is replaced by the isomeric toluidines or chloranilines, xylidines, anisidines, etc. According to the choice of the aromatic amines, the shades vary up to violet.

The capacity of forming two series of dyestuffs according to the sulphonation temperature is characteristic to carbethoxypyridones including therefore also the carbethoxypyridones given in Example 1. In the case of acetyl-pyridones this capacity is lacking.

*Example 3*

The dyestuff base of the following formula

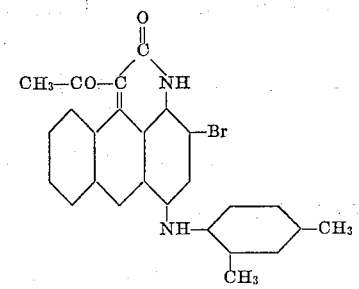

is heated with weak oleum until a sample is soluble to a clear solution in dilute ammonia.

The product obtained dyes wool a violet-red shade. By sulphonating at 70° C., the same dyestuff is obtained as is the case when the temperature of sulphonation is maintained below 45° C. Other acetyl-pyridones behave in the same way.

The dyestuff bases which contain the aniline, m-toluidine and m-chloraniline residues, furnish two series of dyestuffs by mono- and disulphonation in the phenyl nucleus.

If the dyestuff bases are heated with aqueous sulphite and phenol under pressure, then the bromine atom in position 2 is replaced by the sulphonic acid group with formation of a reddish-violet dyestuff. If the m-xylidine residue is replaced by that of an aniline, then a red-violet dyestuff is obtained. With anisidine, cresidine or naphthylamine violet dyestuffs are obtained.

*Example 4*

The dyestuff base of the formula

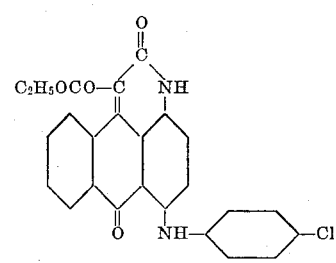

is dissolved in sulphuric acid monohydrate, oleum containing 30% anhydride is added and the solution is heated to 40° C., until a sample is clearly soluble in water.

The product is poured on to ice and brine, filtered off, the separated dyestuff dissolved in water, neutralized with caustic soda solution and salted out. The product thus obtained dyes wool a bluish shade of red.

Example 5

The pyridone of the formula

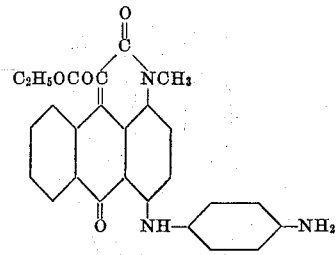

is dissolved in sulphuric acid monohydrate and the solution brought up to about 4% anhydride strength by the addition of oleum and heated to 50° C., until the product is completely soluble in water. It is then poured on to ice, the sulphuric acid neutralized with chalk and the product filtered off. The dyestuff is obtained by evaporating the solution to dryness. The product dyes wool good level violet shades.

Example 6

The dyestuff base of the formula

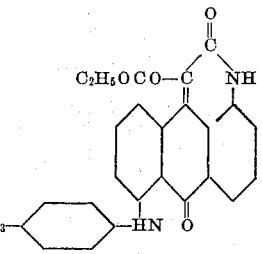

is dissolved in sulphuric acid monohydrate and weak oleum is carefully added thereto. As soon as a sample dissolves in water to a clear solution, the sulphonation product is poured on to ice and brine. The dyestuff when isolated dyes wool a brownish-bordeaux shade.

Example 7

1 part of the compound of the formula

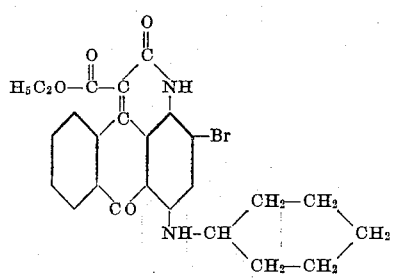

is heated with 1 part of potassium sulphite, 2 parts of water and 4 parts of phenol for 8 hours at 120° C. The phenol is blown off with steam and the residue is filtered from a little insoluble matter and the dyestuff precipitated from the filtrate by the addition of Glauber salt. In dry state it forms a bright bluish-red powder. It dyes wool and silk fast bluish-red shades.

What I claim is:—

1. A process for the manufacture of water soluble dyestuffs of the anthraquinone series, consisting in treating anthrapyridone derivatives of the general formula

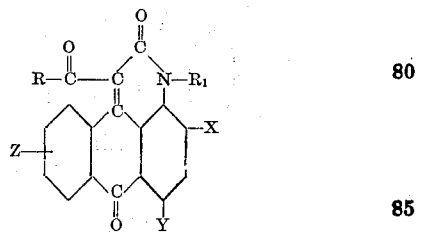

wherein R represent phenyl, alkyl, or alkoxy, $R_1$ represents hydrogen or alkyl, X represents hydrogen, alkyl, alkoxy or halogen, Y represents hydrogen, NH-aryl or NH-cycloalkyl, and Z represents hydrogen, NH-aryl, NH-cycloalkyl or alkyl groups with sulphonating agents.

2. A process for the manufacture of water-soluble dyestuffs of the antraquinone series, consisting in treating anthrapyridone derivatives of the general formula

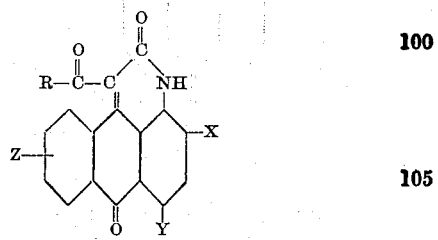

wherein R represents phenyl, alky or alkoxy, X represents hydrogen, alkyl, alkoxy or halogen, Y represents hydrogen, NH-aryl or NH-cycloalkyl and Z represents hydrogen, NH-aryl, NH-cycloalkyl or alkyl groups with sulphonating agents.

3. A process for the manufacture of water soluble dyestuffs of the anthraquinone series, consisting in treating anthrapyridone derivatives of the general formula

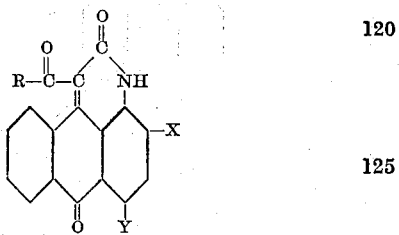

wherein R represents phenyl, alky or alkoxy, X represents hydrogen, alkyl, alkoxy or halogen, and Y represents hydrogen, NH-aryl or NH-cycloalkyl groups with sulphonating agents.

4. A process for the preparation of a water soluble dyestuff of the anthraquinone series, consisting in treating the anthrapyridone compound of the formula

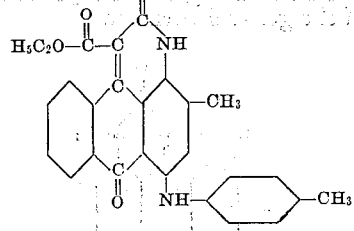

with weak fuming sulphuric acid at a temperature not exceeding 50° C.

5. A process for the preparation of a water soluble dyestuff of the anthraquinone series, consisting in treating the anthrapyridone compound of the formula

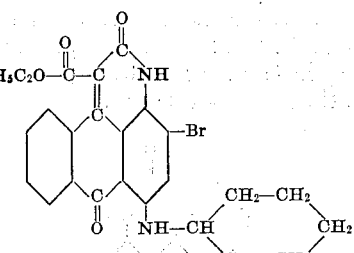

with an alkali metal sulphite, whereby the bromine atom in β-position is replaced by the sulphonic acid group.

6. A process for the preparation of a water soluble dyestuff of the anthraquinone series, consisting in treating the anthrapyridone compound of the formula

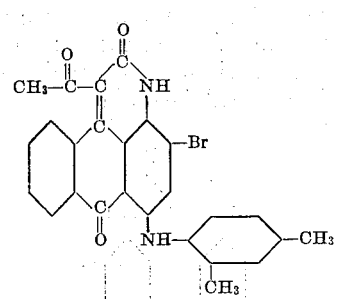

with an alkali metal sulphite, whereby the bromine atom in β-position is replaced by the sulphonic acid group.

7. The water soluble dyestuffs of the anthraquinone series having the general formula

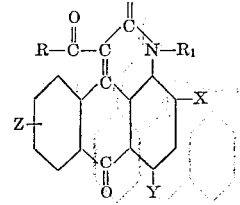

wherein R represents phenyl, alkyl or alkoxy, $R_1$ represents hydrogen or alkyl, X represents hydrogen, alkyl, alkoxy, halogen, sulpho, Y represents hydrogen, NH-aryl, NH-sulphoaryl or NH-cycloalkyl, and Z represents hydrogen, alkyl, NH-aryl or NH-sulphoaryl groups, whereby of Y and Z one represents a NH-aryl, NH-sulphoaryl or NH-cycloalkyl group and whereby at least one sulphonic acid group is present in the molecule, said dyestuffs being in dry state easily water soluble compounds yielding on dyeing yellowish-red, bluish-red to violet shades on animal fibres.

8. The water soluble dyestuffs of the anthraquinone series, having the general formula:

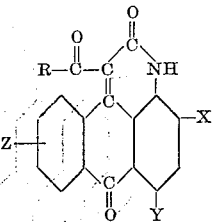

wherein R represents phenyl, alkyl or alkoxy, X represents hydrogen, alkyl, alkoxy, halogen or sulpho, Y represents hydrogen, NH-aryl, NH-sulphoaryl or NH-cycloalkyl, and Z represents hydrogen, alkyl, NH-aryl or NH-sulphoaryl groups, whereby of Y and Z one represents a NH-aryl, NH-sulphoaryl or NH-cycloalkyl group and whereby at least one sulphonic acid group is present in the molecule, said drystuffs being in dry state easily water soluble compounds yielding on dyeing yellowish-red, bluish-red to violet shades on animal fibres.

9. The water soluble dyestuffs of the anthraquinone series, having the general formula

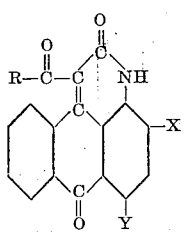

wherein R represents phenyl, alkyl or alkoxy, X represents hydrogen, alkyl, alkoxy, halogen or sulpho, and Y represents NH-aryl, NH-sulphoaryl or NH-cycloalkyl, and whereby at least one sulphonic group is present in the molecule, said dyestuffs being in dry state easily water soluble compounds, yielding on dyeing bright yellowish-red, bluish-red to violet shades on animal fibres.

10. The water soluble dyestuff of the anthraquinone series of the formula

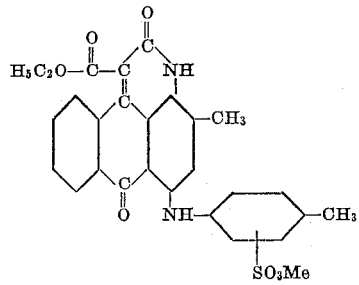

prepared as described in claim 4, which constitutes in dry state a dark red powder, easily soluble in water with a blue-red coloration, and in sulphuric acid with a blue-red coloration, which, on addition of boric acid becomes brown-violet and which dyes animal fibres good level blue-red shades of excellent fastness to light and to washing.

11. The water soluble dyestuff of the anthraquinone series of the formula

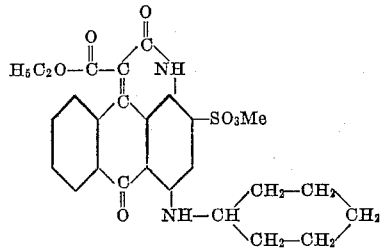

prepared as described in claim 5, which constitutes in dry state a bluish-red cristalline powder, soluble in water with a bright blue-red coloration and in sulphuric acid with a yellow coloration, which on addition of boric acid becomes darker and duller and which dyes animal fibres bright blue-red shades of good fastness to light and to milling.

12. The water soluble dyestuff of the anthraquinone series of the formula

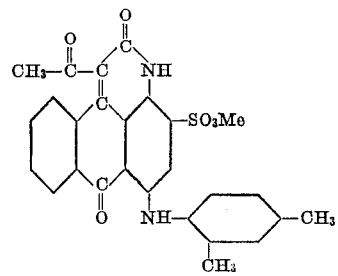

prepared as described in claim 6, which constitutes in dry state a violet powder, easily soluble in water with a violet coloration and in sulphuric acid with a blue-violet coloration, which, on addition of boric acid becomes blue-green and which dyes animal fibres violet shades of excellent fastness to light and to milling.

In witness whereof I have hereunto signed my name this 25th day of February 1932.

ALBIN PETER.